United States Patent

Bellinger et al.

[19]

[11] Patent Number: 6,003,396
[45] Date of Patent: Dec. 21, 1999

[54] SYSTEM FOR CONTROLLING DOWNSHIFT POINTS OF AUTOMATICALLY SELECTABLE TRANSMISSION GEARS

[75] Inventors: Steven M. Bellinger; David J. Munt; Stephen L. Cooper; Daniel W. Bache, all of Columbus, Ind.

[73] Assignee: Cummins Engine Company, Inc., Columbus, Ind.

[21] Appl. No.: 09/063,474

[22] Filed: Apr. 20, 1998

[51] Int. Cl.$^6$ .................................................. F16H 59/30
[52] U.S. Cl. ............................ 74/336 R; 477/120; 74/335
[58] Field of Search ......................... 477/110, 120, 477/122, 92; 74/336 R, 335

[56] References Cited

U.S. PATENT DOCUMENTS

| | | | |
|---|---|---|---|
| 4,361,060 | 11/1982 | Smyth . | |
| 4,852,006 | 7/1989 | Speranza | 477/78 X |
| 4,916,979 | 4/1990 | Irwin | 477/94 |
| 4,933,850 | 6/1990 | Wheeler | 477/92 X |
| 5,053,963 | 10/1991 | Mack | 477/120 X |
| 5,089,962 | 2/1992 | Steeby | 477/120 X |
| 5,133,232 | 7/1992 | Kikuchi et al. . | |
| 5,201,251 | 4/1993 | Kitagawa et al. | 477/120 X |
| 5,235,876 | 8/1993 | Minowa et al. . | |
| 5,315,514 | 5/1994 | Steeby et al. | 477/122 X |
| 5,319,555 | 6/1994 | Iwaki et al. . | |
| 5,411,449 | 5/1995 | Takanashi et al. . | |
| 5,441,464 | 8/1995 | Markyvech | 477/110 X |
| 5,459,658 | 10/1995 | Morey et al. . | |
| 5,470,290 | 11/1995 | Minowa et al. . | |
| 5,568,748 | 10/1996 | Carlson et al. . | |
| 5,598,335 | 1/1997 | You . | |
| 5,603,673 | 2/1997 | Minowa et al. . | |
| 5,669,847 | 9/1997 | Kashiwabara . | |
| 5,672,139 | 9/1997 | Horiguchi . | |

*Primary Examiner*—Khoi Q. Ta
*Attorney, Agent, or Firm*—Baker and Daniels

[57] ABSTRACT

A system for controlling automatic transmission downshift points includes a control computer for electronically controlling an internal combustion engine and a transmission having at least one automatically selectable gear. The control computer is responsive to at least a throttle signal, provided by either a manually actuatable accelerator pedal or a cruise control system, to compute an engine load value, and is further responsive to either an engine speed signal or a vehicle speed signal to compute a deceleration value. The control computer is operable to compute a downshift engine RPM value based on the deceleration value and either the throttle signal or the engine load value, wherein the downshift engine RPM value is lower than a default downshift engine RPM if the deceleration value indicates a relatively slow deceleration rate and the throttle signal or the engine load value indicates high throttle or engine load. Conversely, the downshift engine RPM value is higher than the default downshift engine RPM value if the deceleration value indicates a relatively high deceleration rate and the throttle signal or the engine load indicates high throttle or engine load.

19 Claims, 5 Drawing Sheets

| DOWNSHIFT SCENARIO | DOWNSHIFT POINT (ENGINE RPM) |
|---|---|
| HIGH THROTTLE | 1250 RPM |
| LOW THROTTLE | 1200 RPM |
| ENGINE BRAKE ACTIVE | 1300 RPM |

AUTOMATIC DOWNSHIFT POINTS (ENGINE RPM)

| ENGINE/VEHICLE DECELERATION | THROTTLE % OR ENGINE LOAD % | |
|---|---|---|
| | < X% | ≥ X% |
| TH1 < E/V DECEL < TH2 | DEFAULT RPM | DEFAULT − CAL1 RPM |
| > TH3 | DEFAULT RPM | DEFAULT + CAL2 RPM |

AUTOMATIC DOWNSHIFT OFFSETS (RPM)

THROTTLE OR ENGINE LOAD % →

VEHICLE OR ENGINE DECELERATION ↓

| 0 | 0 | 0 | 0 | 0 | 0 | 0 | 0 |
|---|---|---|---|---|---|---|---|
| 0 | 0 | 0 | 0 | 0 | 0 | 0 | -2 |
| 0 | 0 | 0 | 0 | 0 | 0 | -1 | -3 |
| 0 | 0 | 0 | 0 | 0 | 0 | 0 | -2 |
| 0 | 0 | 0 | 0 | 0 | 0 | 0 | 1 |
| 0 | 0 | 0 | 0 | 0 | 0 | 1 | 2 |
| 0 | 0 | 0 | 0 | 0 | 1 | 2 | 3 |
| 0 | 0 | 0 | 0 | 1 | 2 | 3 | 4 |

DOWNSHIFT POINT = DEFAULT + OFFSET RPM

FIG. 6

SYSTEM FOR CONTROLLING DOWNSHIFT POINTS OF AUTOMATICALLY SELECTABLE TRANSMISSION GEARS

FIELD OF THE INVENTION

The present invention relates generally to systems for controlling automatic and semiautomatic transmissions, and more specifically to systems for controlling downshift points in such transmissions.

BACKGROUND OF THE INVENTION

Automatic and semiautomatic transmissions, the latter of which are defined for purposes of the present invention as transmissions having a number of manually selectable gear ratios and a number of automatically selectable gear ratios, are known and widely used in the automotive and heavy duty truck industries. In vehicles including such transmissions, a control computer is typically provided for controlling the shifting between the automatically selectable gear ratios in accordance with various engine and vehicle operating conditions.

One specific embodiment of a known semiautomatic transmission used with heavy duty trucks is commonly referred to as a "TOP-2" transmission, wherein a number of the numerically high gear ratios (i.e. numerically lower gears such as 1st, 2nd, 3rd, etc.) are manually selectable, and shifting between the numerically lowest two gear ratios (i.e. numerically highest, or Top-2, gears) is managed by a control computer pursuant to a gear shifting control algorithm. Examples of such TOP-2 transmissions and control algorithms therefore are given in U.S. Pat. Nos. 5,393,276, 5,393,277, 5,401,223, 5,498,195, 5,591,102, 5,609,548 and 5,638,271 to White et al., each of which are assigned to the assignee of the present invention, the disclosures of which are incorporated herein by reference.

In controlling shifting between the automatically selectable gear ratios of such a semiautomatic transmission, the control computer is typically operable to vary the automatic downshift points (i.e. the engine RPM at which the control computer automatically shifts to the next lower gear) in accordance with certain engine operating conditions. FIG. 3 illustrates an example of one prior art downshift point modulation scenario 85, wherein a control computer is operable to vary the downshift points from an automatically selectable top gear of a semiautomatic transmission to the next lower automatically selectable gear. Under high throttle percentage conditions such as when encountering a steep grade, the control computer sets the downshift point at 1250 RPM to thereby maintain a high engine RPM for high throttle operation. Under a low throttle percentage conditions, the control computer moves the downshift point down to 1200 RPM. Finally, if the engine includes an engine brake system, the control computer moves the downshift point up to 1300 RPM whenever the engine brakes are enabled and the throttle percentage is below some low throttle percentage level, to thereby maintain a higher engine RPM for optimal engine brake operation.

Although the foregoing downshift modulation scenario provides for satisfactory operation under low throttle and active engine brake operating conditions, the downshift scenario for high throttle operation has certain drawbacks associated therewith. For example, when the vehicle approaches a small hill, it may be preferable from the driver's perspective to forego a downshift if the vehicle can traverse the small hill above some acceptable engine RPM level. Implementation of such a shift strategy requires moving the high throttle downshift point to a lower engine RPM. Such a downshift scenario results in "later" downshifts and in some cases results in no downshift at all if the vehicle can traverse the small hill at some reduced, but acceptable, engine RPM. Conversely, when the vehicle approaches a steep grade, it is preferable from the driver's perspective to downshift "earlier" in order to maintain higher average engine RPM and thereby minimize the total number of shifts needed to traverse the steep grade. Implementation of this shift strategy requires moving the high throttle downshift point to a higher engine RPM level. While both of these downshift scenarios are desirable, both represent mutually exclusive shifting goals using known downshifting criteria.

Designers of engine and transmission control systems have heretofore addressed the foregoing problem by providing a system that raises the downshift RPM point for assisted hill climbing if a driver manually activates the system, typically by modulating the accelerator pedal in a predetermined manner (e.g. by releasing the accelerator pedal and thereafter applying 100% throttle within some predefined time period). One problem with this approach, however, is that downshift point modulation requires driver intervention. Drivers may thus tend to use this feature when it is not needed, thereby resulting in degraded fuel economy.

What is therefore needed is a system for electronically controlling automatic transmission downshift points that is sensitive to variations in the grades encountered by the vehicle. Preferably, such a system should lower the downshift RPM point when encountering a small grade and should raise the downshift RPM point when encountering a steep grade, thereby maximizing fuel economy and minimizing the total number of shifts.

SUMMARY OF THE INVENTION

The foregoing shortcomings of the prior art are addressed by the present invention. In accordance with one aspect of the present invention, a system for controlling downshifting of an automatically selectable gear of a transmission coupled to an internal combustion engine of a vehicle comprises means for determining one of engine and vehicle deceleration, means for determining one of a commanded throttle percentage and engine load, means for determining a downshift engine RPM of an automatically selectable gear of a transmission coupled to an internal combustion engine based on one of engine and vehicle deceleration and on one of commanded throttle percentage and engine load, and means for controlling downshifting of the automatically selectable gear of the transmission based on the downshift engine RPM.

In accordance with another aspect of the present invention, a system for controlling downshifting of an automatically selectable gear of a transmission coupled to an internal combustion engine of a vehicle comprises an internal combustion engine carried by a vehicle, means for determining one of engine RPM and vehicle speed and producing a speed signal corresponding thereto, a fuel system responsive to a fueling signal to supply fuel to the engine, means for producing a throttle signal, a transmission coupled to the engine and having at least one automatically selectable gear, and a control computer responsive to the throttle signal to produce the fueling signal. The control computer determines an engine load value based on the fueling signal and a deceleration value based on the speed signal, and the control computer determines a downshift engine RPM of the at least one automatically selectable gear based on the deceleration value and one of the throttle signal and said engine load value, and controls downshifting of the at least one automatically selectable gear based on the downshift engine RPM.

In accordance with a further aspect of the present invention, a method of controlling downshifting of an automatically selectable gear of a transmission coupled to an internal combustion engine of a vehicle comprises the steps of determining one of engine and vehicle deceleration, determining one of a commanded throttle percentage and engine load, determining a downshift engine RPM of an automatically selectable gear of a transmission coupled to an internal combustion engine of a vehicle based on the one of engine and vehicle deceleration and the one of commanded throttle percentage and engine load, and controlling downshifting of the automatically selectable gear of the transmission based on the downshift engine RPM.

One object of the present invention is to provide an improved system for controlling shifting of automatically selectable transmission gears.

Another object of the present invention is to provide such a system operable to move the shift point of at least one automatically selectable transmission gear to a higher engine RPM upon detection of a steep grade encountered by a moderately loaded vehicle (or a moderate grade encountered by a heavily loaded vehicle), and move the shift point to a lower engine RPM upon detection of a shallow grade encountered by the vehicle.

These and other objects of the present invention will become more apparent from the following description of the preferred embodiment.

BRIEF DESCRIPTION OF THE DRAWINGS

FIG. 3 is a table illustrating one prior art technique for controlling automatic downshifting of the transmission illustrated in FIG. 1.

FIG. 5 is a table illustrating one embodiment of a technique for mapping engine/vehicle-operating conditions to transmission downshift RPM values, in accordance with the present invention.

FIG. 6 is a table illustrating another embodiment of a technique for mapping engine/vehicle-operating conditions to transmission downshift RPM values, in accordance with the present invention.

DESCRIPTION OF THE PREFERRED EMBODIMENT

Figure 1:
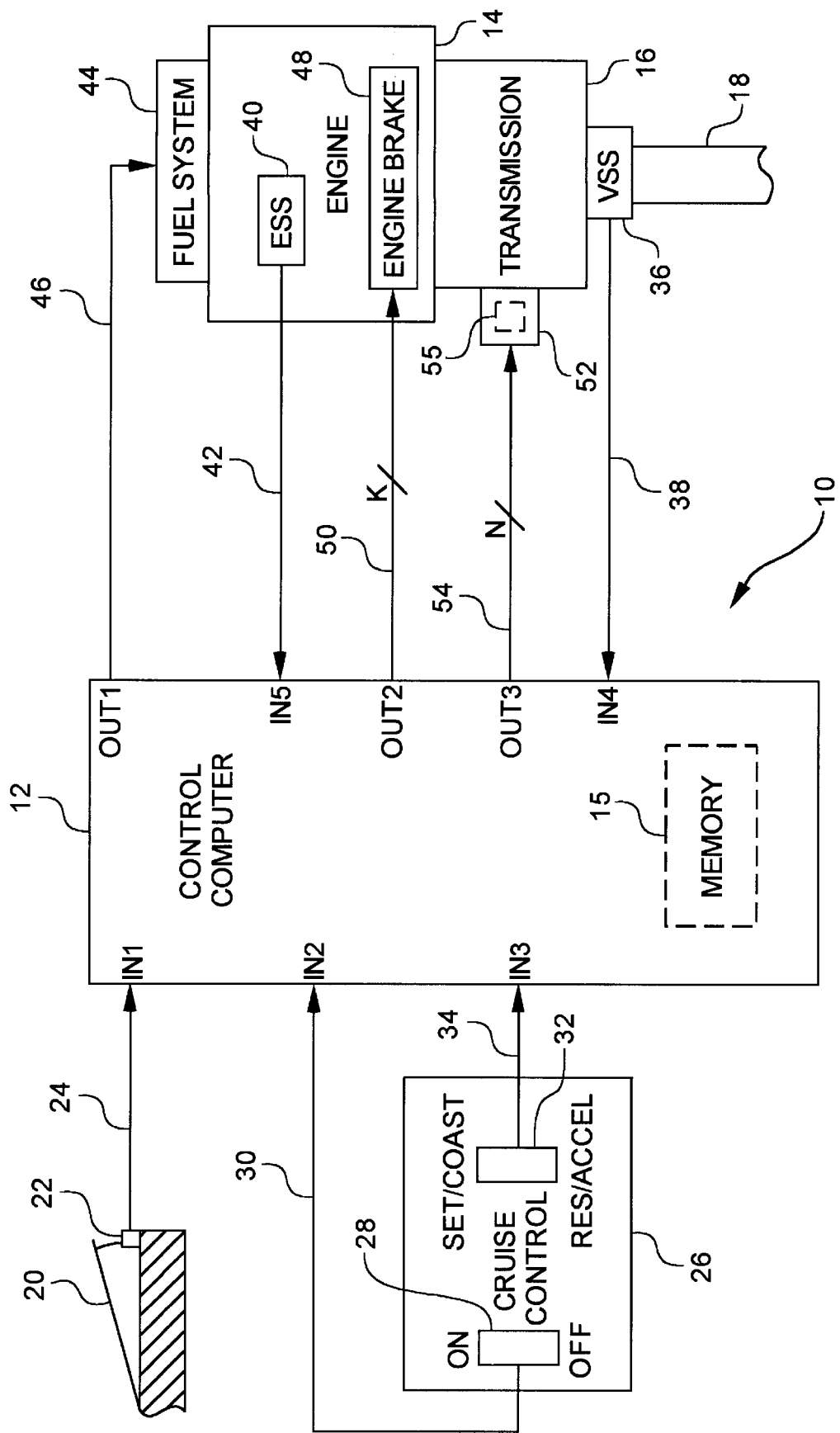
FIG. 1 is a diagrammatic illustration of one embodiment of a system for controlling automatic selection of gears of a transmission, in accordance with the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, one preferred embodiment of a system 10 for controlling downshift points of automatically selectable gear ratios of a transmission, in accordance with the present invention, is illustrated. System 10 includes a control computer 12 which is operable to control an engine 14 and a transmission 16 connected thereto, as is known in the art. Control computer 12 is often referred to as an engine control module (ECM), engine control unit (ECU) or the like, is preferably microprocessor-based and includes a memory unit 15. Control computer 12 is operable, as is well known in the art, to control and manage many vehicular operations, such as those associated with the operation of the engine 14 and transmission 16, in accordance with software algorithms and operational data typically stored within memory unit 15.

Many engine/vehicle sensors, switches and other vehicle/engine components interface with control computer 12 during the operation thereof, and some examples of such components, as they relate to the present invention, are illustrated in FIG. 1. For example, system 10 includes an accelerator pedal 20 having a pedal position sensor 22 associated therewith which is electrically connected to input IN1 of control computer 12 via signal path 24. Pedal position sensor 22 is responsive to the position of accelerator pedal 20 to provide an accelerator pedal position signal to control computer 12 via input IN1. In one embodiment, the accelerator pedal position sensor 22 is a potentiometer connected at one end to a suitable voltage (such as 5 or 12 volts) and at an opposite end to ground potential. The wiper of such a potentiometer is mechanically coupled to the accelerator pedal 20, as is known in the art, and is electrically connected to signal path 24 so that the voltage present on signal path 24 is directly proportional to accelerator pedal position. Those skilled in the art will, however, appreciate that other known accelerator pedal position sensors may be used to provide the accelerator pedal position signal to control computer 12, wherein examples of some such components include, but are not limited to, pressure sensors, magnetic or HALL effect sensors and the like.

System 10 further includes a vehicle cruise control unit 26 operable as is known in the art to provide control computer 12 with signals corresponding to desired road speed. Control computer 12 is, in turn, responsive to the signals provided by cruise control unit 26 to fuel the engine 14 accordingly. Cruise control unit 26 includes an ON/OFF switch 28 that is electrically connected to input IN2 of control computer 12 via signal path 30. Preferably, ON/OFF switch 28 is a known single pole single throw switch. Cruise control unit 26 also includes a multifunction switch 32 that is electrically connected to input IN3 of control computer 12 via signal path 34. Preferably, switch 32 is a known center-off switch further having a SET/CRUISE position and a RESUME/ACCEL position. Control computer 12 is responsive to an appropriate signal on signal path 34 to perform the known SET, COAST, RESUME and ACCEL operational modes associated with cruise control system 26. In accordance with operator actuation of ON/OFF switch 28, a corresponding signal is provided on signal path 30 to which control computer 12 is responsive to enable operation of cruise control system 26. Actuation of ON/OFF switch 26 from the OFF position to the ON position has no discernible affect on vehicle or engine operation, and only provides an appropriate signal on signal path 30 to which control computer 12 is responsive to enable processing of further cruise control signals provided on signal path 34, thereby allowing subsequent operation of cruise control system 26 as is known in the art. Actuation of the ON/OFF switch 28 from the ON position to the OFF position conversely provides a signal on signal path 30 to which control computer 12 is responsive to disable further operation of cruise control system 26. When ON/OFF switch 28 is in the OFF position, control computer 12 is preferably non-responsive to any signals provided on signal path 34.

When switch 28 is in the off position, control computer 12 is responsive to the accelerator position signal on signal path 24, to produce a fueling request signal which is further processed, as is known in the art, to produce one or more fuel control signals for fueling the engine 14 as will be described in greater detail hereinafter. Conversely, when switch 28 is in the on position, control computer 12 is responsive to cruise control signals on signal path 34 to produce the fueling request signal. For the purposes of the present invention, the accelerator position signal on signal path 24 and the cruise control signals on signal path 34 will be interchangeably referred to as a commanded throttle percentage or throttle signal, it being understood that control computer 12 is responsive to either the accelerator pedal position signal or the cruise control signal, but not both, to produce the fueling request signal.

Control system 10 further includes a vehicle speed sensor (VSS) 36 electrically connected to an input IN4 of control computer 12 via signal path 38. Vehicle speed sensor 36 is operable to sense vehicle speed and provide a vehicle speed signal to control computer 12 corresponding thereto. In one embodiment, vehicle speed sensor 36 is a variable reluctance sensor positioned about a tailshaft 18 extending from transmission 16, although the present invention contemplates that the vehicle speed sensor 36 may be any known sensor positioned at a suitable vehicle location, wherein such a sensor is operable to provide control computer 12 with a signal indicative of vehicle speed.

The engine 14 is preferably an internal combustion engine and includes an engine speed sensor 40 associated therewith which is electrically connected to input IN5 of control computer 12 via signal path 42. The engine speed sensor (ESS) 40 is operable to sense engine rotational speed (typically in RPMs) and/or engine position (typically in degrees relative to TDC), and provide an engine speed signal corresponding thereto on signal path 42. In one embodiment, engine speed sensor 40 is a HALL effect sensor responsive to passage thereby of a number of teeth of a gear or wheel rotating in synchronism with the engine 14 to provide the engine speed signal on signal path 42. Those skilled in the art will, however, appreciate that engine speed sensor 40 may alternatively be a variable reluctance or other known sensor operable to sense engine speed and/or position and provide a corresponding engine speed signal.

Control computer 12 includes a first output OUT1 electrically connected to a fuel system 44, associated with the engine 14, via signal path 46. Fuel system 44 may be any known fuel system including one or more fuel injectors, etc., and is responsive to fuel control signals provided thereto by control computer 12 to fuel the engine 14 accordingly.

A second output port OUT2 of control computer 12 is electrically connected to an engine brake 48 via a number, K, of signal paths 50, wherein K may be any integer. Engine brake 48 may include a number of separately actuatable brakes and is operable, as is known in the art, to retard engine speed upon activation thereof.

Transmission 16 is, in accordance with the present invention, a manual-automatic transmission having a number of manually selectable gear ratios and a number of automatically selectable gear ratios. Transmission 16 includes a transmission control unit 52 having a number of electrical signal inputs connected to an output port OUT3 of control computer 12 via a number, N, of signal paths 54, wherein N may be any integer. Transmission control unit 54 is responsive to control signals provided by control computer 12 on signal paths 54 to control automatic shifting between the number of automatically selectable gear ratios of transmission 16 as is known in the art.

In one embodiment, manual-automatic transmission 16 is a splitter-type transmission, defined here as a known transmission having a splitter clutch that is actuatable, either manually by the vehicle operator or automatically under the control of control computer 12 pursuant to an automatic shifting control algorithm, to accomplish shifting between the transmission gear ratios. As is known in the art, transmission control unit 44 is responsive, in an automatic shifting mode, to control signals provided by control computer 12 at output OUT3 to control the actuation of the splitter clutch in accordance with the control signals.

Figure 2A:
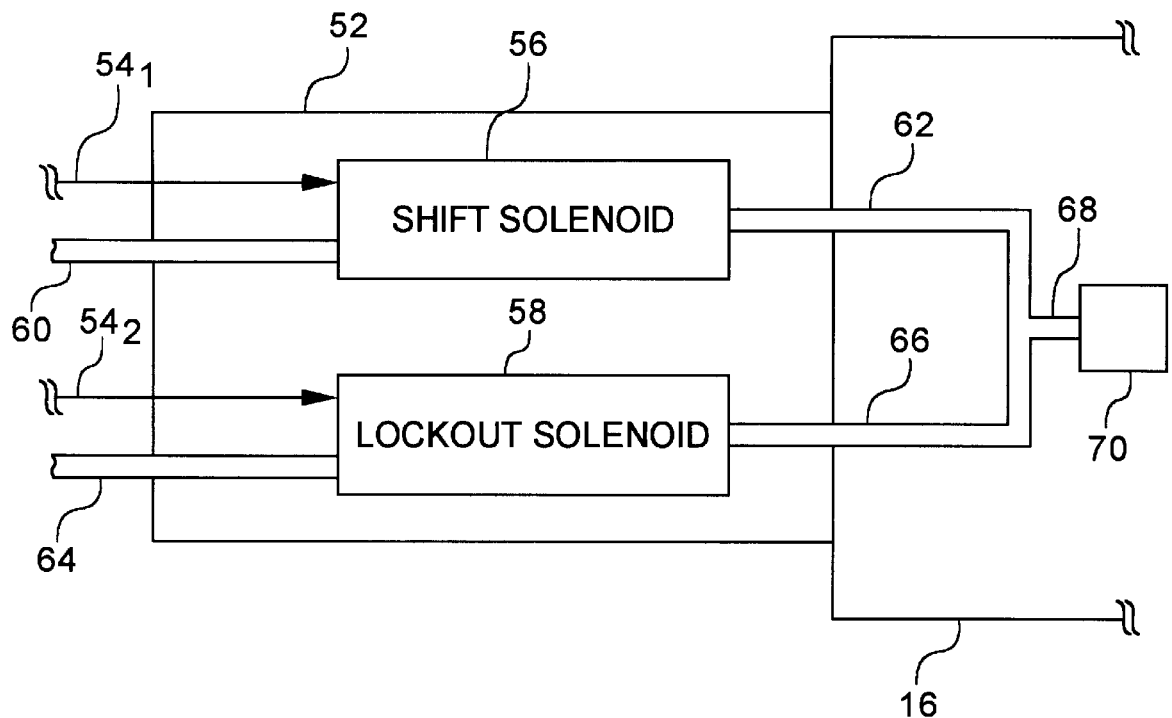
FIG. 2A is a diagrammatic illustration of one embodiment of a semiautomatic transmission, and controls therefore, for use with the present invention.

Referring now to FIG. 2A, one embodiment of a transmission 16 and associated transmission control unit 52, in accordance with the present invention, is shown. The transmission 16 illustrated in FIG. 2A is preferably a "Top-2" transmission, as this term is defined hereinabove, and is manufactured by Eaton Corporation as a series RTL-1x710B-T2 AutoRange 10-speed transmission (wherein x may be 1, 2, 3 or 4), although those skilled in the art will recognize that transmission 16 may be any automatic or semiautomatic transmission responsive to one or more control signals to accomplish shifting between the automatically selectable gear ratios. Details of transmission control unit 52, as described hereinafter, could thus easily be modified by a skilled artisan to accommodate an automatic or manual-automatic transmission having more or less than 2 automatically selectable gear ratios. Details of the splitter clutch associated with transmission 16 are known and not critical to the description of the present invention, and an illustration thereof has accordingly been omitted from FIG. 2A for brevity.

The transmission control unit 52 for the particular Top-2 transmission 16 under discussion includes a shift solenoid 56 having one of the signal paths $54_1$ from output OUT3 of control computer 12 electrically connected thereto, and a lockout solenoid 58 having another one of the signal paths $54_2$ from OUT3 electrically connected thereto. A pressurized air conduit 60 is coupled to the shift solenoid 56 and a second pressurized air conduit 64 is coupled to the lockout solenoid 58. Air conduit 62 extends from shift solenoid 56 and air conduit 66 extends from lockout solenoid 58. Air conduits 62 and 66 feed a single conduit 68 that is coupled to a shift actuator 70 which, in the particular embodiment of transmission 16 under discussion, is preferably a pneumatically controlled splitter clutch. It is to be understood, however, that the present invention contemplates that the splitter clutch may alternatively be an electronically controlled pneumatic splitter clutch or a strictly electronically controlled splitter clutch.

During automatic operation of transmission 16; i.e. computer controlled shifting, control computer 12 provides signals on signal paths $54_1$ and $54_2$ to control the solenoids 56 and 58 in accordance with the desired gear ratio. For example, if the lower of the Top-2 gears (i.e. 9th gear) is requested, the lockout solenoid 58 is energized so that the status of the shift solenoid has no effect, and the shift actuator 78 is forced to low split (lowest of the Top-2 gears is selected and engaged). If, on the other hand, the higher of the Top-2 gears (i.e. 10th gear) is requested, the lockout solenoid is de-energized and the shift solenoid is energized, thereby allowing pressurized air to flow through conduits 60, 62 and 68 and forcing the shift actuator 70 to high split (highest of the Top-2 gears is selected and engaged).

Figure 2B:
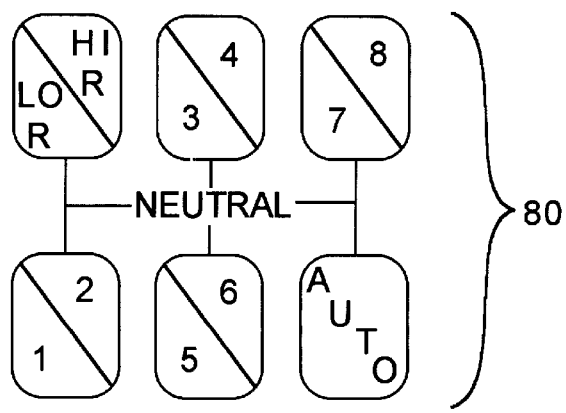
FIG. 2B is a diagrammatic illustration of a shift pattern for the semiautomatic transmission embodiment illustrated in FIG. 2A.

Referring now to FIG. 2B, a known and preferred shift pattern 80 for the 10-speed Top-2 transmission 16 shown in FIG. 2A is illustrated. Transmission 16 has two manually selectable reverse gear ratios, LO R and HI R, eight manually selectable gear ratios, 1–8, and two automatically selectable (Top-2) gear ratios. In reverse gear operation, the driver may select between LO R and HI R, typically via actuation of a splitter switch (not shown) as is known in the art. In forward gear operation, the manually selectable gear ratios are arranged in pairs to facilitate shifting between gear pairs via the splitter button. Thus, if the driver starts forward motion in first gear as is typical, the splitter button is in a LO position. When the driver wishes to subsequently shift into second gear, shift lever 50 need not be actuated and the splitter switch need only be moved to a HI position. This causes the pressurized air to pass to shift solenoid 56, which in turn causes the shift solenoid 56 to actuate the splitter clutch 70 and thereby shift transmission into second gear. When the driver wishes to subsequently shift into third gear, the splitter switch is returned to the LO position which cuts off the pressurized air to solenoid 56 and thereby deactuates the splitter clutch 70, and the driver must manually move the gear shift lever (not shown) into the ¾ position. Manual shifting of transmission 16, either in the upshifting or downshifting directions, is carried out in like manner.

When the driver desires shifting of transmission 16 to be controlled by control computer 12 in either of the Top-2 gear ratios (9th and 10th gears), the gear shift lever is manually moved (typically from the ⅞ position) into the AUTO position. Thereafter, control computer 12 automatically controls shifting between the Top-2 gears in accordance with a known TOP-2 control software resident within memory 15 of control computer 12. Control computer 12 is responsive to several engine and vehicle operating parameters, such as vehicle speed, engine speed, engine fueling, etc., to control shifting between the Top-2 gears of transmission 16 according to known Top-2 control software resident within control computer 12. As an example of such control, memory unit 15 of control computer 12 typically includes engine RPM shift point values therein, whereby control computer 12 is operable to dictate the particular engine speeds at which upshifting and downshifting between the various automatically selectable gears occurs. In accordance with the present invention, control computer 12 is operable to modulate the downshift engine RPM from high split to low split, depending upon either the commanded throttle percentage or computed engine load and further upon either computed engine deceleration or vehicle deceleration, so that the downshift engine RPM is raised upon detection of a steep grade encountered by the vehicle and is lowered upon detection of a shallow grade encountered by the vehicle. Accordingly, downshifting occurs "earlier" when climbing a steep hill or grade (corresponding to high deceleration rates), and downshifting occurs later, if at all, when climbing small hills or grades (corresponding to slow deceleration rates). Under either of the foregoing scenarios, the commanded throttle percentage or engine load is typically high, and by requiring the commanded throttle percentage or engine load to be above some threshold level, the low throttle and active engine brake shift points (discussed in the background section) are not affected by controlling the downshift engine RPM according to the present invention.

Figure 4:
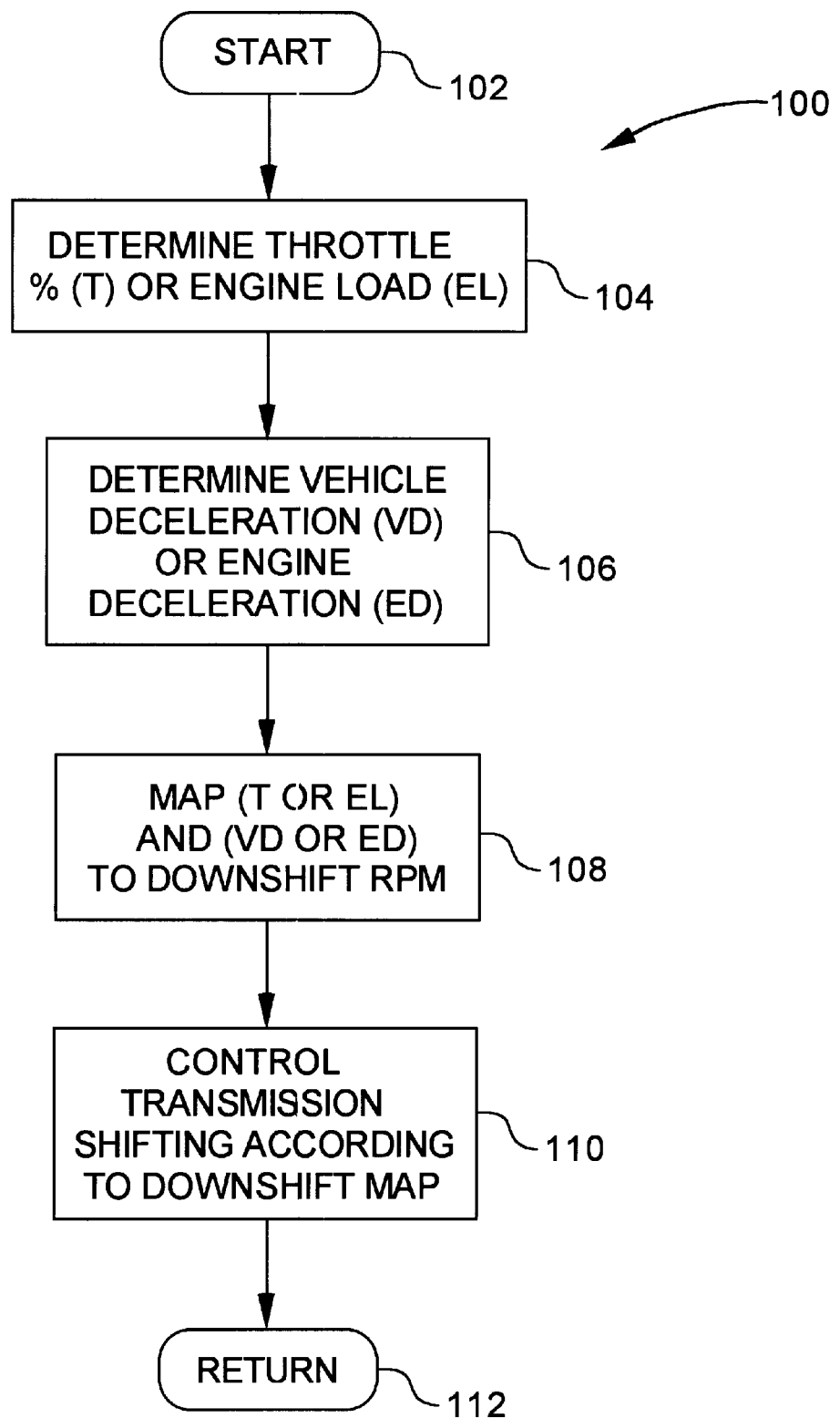
FIG. 4 is a flowchart illustrating one embodiment of a software algorithm executable by the system of FIG. 1 for controlling transmission downshifts.

Referring to FIG. 4, a flowchart is shown illustrating one preferred embodiment of a software algorithm 100 for controlling automatic downshift engine RPMs (shift points) in the system of FIG. 1, in accordance with the present invention. Algorithm 100 is preferably stored within memory unit 15 and is executable by control computer 12 many times per second. Algorithm 100 begins at step 102 and at step 104, control computer 12 is operable to determine either a commanded throttle percentage (T) or engine load value (EL). Either of these parameters may be used by control computer 12 in controlling automatic downshift points, although the present invention contemplates using one parameter under certain operating conditions and the other parameter under other operating conditions. For example, control computer 12 may use commanded throttle percentage (T) when fueling of the engine 14 is controlled by the accelerator pedal 20, and may use engine load (EL) when fueling is controlled by the cruise control unit 26. In any case, the present invention contemplates using either T or EL as a measure of current engine fueling conditions. If using T, control computer 12 is responsive to the accelerator pedal position signal on signal path 24, or to the cruise control signals on signal path 34, to determine the commanded throttle percentage. If using EL, control computer 12 is operable to compute engine load in accordance with any known technique, and in one embodiment engine load is computed as a ratio of currently commanded engine fueling rate and engine fueling rate under wide open throttle conditions. Control computer 12 controls engine fueling via output OUT1, typically according to fueling and timing maps stored within memory unit 15, and thus has constant access to all information necessary for computing engine load (EL).

Algorithm execution continues from step 104 at step 106 where control computer 12 is operable to determine either a vehicle deceleration value (VD) or engine deceleration value (ED). As with step 104, either deceleration parameter may be used by control computer 12 in controlling automatic downshift points in a manner to be described hereinafter. If using vehicle deceleration, control computer 12 is preferably operable to receive the vehicle speed signal on signal path 38 and to differentiate the signal to produce a vehicle deceleration value corresponding to a rate of vehicle deceleration. It is to be understood, however, that control computer 12 may compute or estimate vehicle deceleration in accordance with other known techniques, the importance of any such technique lying in the ability to determine a rate of vehicle deceleration. If using engine deceleration, control computer 12 is preferably operable to receive the engine speed signal on signal path 42 and to differentiate the signal to produce an engine deceleration value corresponding to a rate of engine deceleration. It is to be understood, however, that control computer 12 may compute or estimate engine deceleration in accordance with other known techniques, the importance of any such technique lying in the ability to determine a rate of engine deceleration.

Algorithm execution continues from step 106 at step 108 where control computer 12 is operable to map either of the T or EL values along with either of the VD or ED values determined in steps 104 and 106 to a downshift engine RPM value. In general, control computer 12 is operable at step 108 to decrease the downshift engine RPM value if the T or EL value is above some first threshold value and the VD or ED value is below some second threshold value, which operating conditions are indicative of climbing a shallow grade or small hill. If the T or EL value is above the first threshold value and the VD or ED value is above some threshold value, which operating conditions are indicative of climbing a steep grade, control computer 12 is operable to raise the downshift engine RPM value. The present invention contemplates using any known technique for performing such mapping at step 108. Examples of such mapping techniques include, but are not limited to, using one or more equations relating T or EL and VD or ED to desired downshift engine RPM values, using one or more look-up tables containing downshift engine RPM values as a function of T or EL and of VD or ED, and the like.

One example of a simple look-up table 90 relating these operating parameters to downshift engine RPM values is illustrated in FIG. 5. Referring to FIG. 5, VD or ED ranges are set forth in the leftmost column, and the following two columns list desired engine downshift RPM values based on T or EL threshold values. If VD or ED is between threshold VD or ED values of TH1 and TH2 and T or EL is below some threshold of X%, control computer 12 is operable at step 108 to set the downshift engine RPM value at some default RPM value, or at some other RPM value pursuant to some other downshifting algorithm. If, however, T or EL is above X%, control computer 12 is operable to lower the downshift engine RPM value by a calibratable value CAL1 RPM below the default downshift engine RPM value. CAL1 is preferably set within memory unit 15 by a known service/engine recalibration tool, although the present invention contemplates using any known technique for loading, or changing, the CAL1 value within memory 15, such as via radio, cellular or other known communication techniques. In one embodiment, CAL1 is typically between 50 and 150 RPM, although the present invention contemplates that CAL1 may be set at any desired RPM value.

If VD or ED is above threshold value TH3, which is preferably above threshold values TH1 and TH2, and T or EL is below X%, control computer 12 is operable at step 108 to set the downshift engine RPM value at the default value, or at some other RPM value pursuant to some other downshifting algorithm. If, however, T or EL is above X%, control computer 12 is operable to raise the downshift engine RPM value by a calibratable value CAL2 RPM above the default downshift engine RPM value. As with CAL1, CAL2 is preferably set within memory unit 15 by a known service/engine recalibration tool, although the present invention contemplates using any known technique for loading, or changing, the CAL2 value within memory 15, such as via radio, cellular or other known communication techniques. In one embodiment, CAL2 is typically between 50 and 150 RPM, although the present invention contemplates that CAL2 may be set at any desired RPM value.

Another example of a look-up table 92 relating the engine/vehicle operating parameters to downshift engine RPM values is illustrated in FIG. 6. Referring to FIG. 6, the rows of table 92 correspond to downwardly increasing VD or ED values and the columns correspond to rightwardly increasing T or EL values. The table 92 contains integer values ranging from −3 to 4, which are representative of offset RPM values to be added to the default downshift engine RPM value under operating condition specified by table 92. For example, −1 may correspond to 50 RPM, −2 may correspond to −100 RPM, −3 may correspond to −150 RPM, and 1–4 may correspond to 35, 70, 105 and 140 RPM respectively. Thus, according to table 92, control computer 12 is operable to modulate the downshift engine RPM values as a piecewise function of T or EL and of VD or ED. Block 94 of table 92 represents engine/vehicle operating conditions which are indicative of climbing a shallow grade or small hill (T or EL high and VD or ED low or within some low range), and block 96 represents engine/vehicle operating conditions which are indicative of climbing a steep grade. As both VD or ED and T or EL increase, the downshift engine RPM offset values likewise increase.

Referring again to FIG. 4, algorithm execution continues from step 108 at step 110 wherein control computer is operable to control the downshifting of transmission 16, as is known in the art, according to the downshift map as modified at step 108. Algorithm execution continues from step 110 at step 112 where execution of algorithm 100 is returned to its calling routine. Alternatively, algorithm 100 may loop from step 110 to step 104 for continuous operation thereof.

While the invention has been illustrated and described in detail in the foregoing drawings and description, the same is to be considered as illustrative and not restrictive in character, it being understood that only the preferred embodiment has been shown and described and that all changes and modifications that come within the spirit of the invention are desired to be protected. For example, while the present invention has been described herein as being primarily directed to controlling automatically selectable gears of a semi-automatic transmission, those skilled in the art will recognize that the concepts described herein may be applied to fully automatic transmissions. As another example, the transmission control unit 52 has been described in one preferred embodiment as including only electrically and pneumatically actuatable solenoids, although the present invention contemplates that control unit 52 may include another control computer 55 (shown in phantom in FIG. 1) adapted for communication with control computer 12 via signal path 54, wherein signal path 54 would be a bi-directional serial or parallel communication path. Any information available to control computer 12 would accordingly be available to the control computer included within the transmission control unit 52, and the control computer within unit 52 could accordingly execute algorithm 100 illustrated in FIG. 4.

What is claimed is:

1. A system for controlling downshifting of an automatically selectable gear of a transmission coupled to an internal combustion engine of a vehicle, comprising:

means for determining one of engine and vehicle deceleration;

means for determining one of a commanded throttle percentage and engine load;

means for determining a downshift engine RPM of an automatically selectable gear of a transmission coupled to an internal combustion engine based on a comparison of a rate of said one of engine and vehicle deceleration with at least one predefined deceleration rate and on said one of commanded throttle percentage and engine load; and means for controlling downshifting of said automatically selectable gear of said transmission based on said downshift engine RPM.

2. The system of claim 1 wherein said means for determining engine deceleration includes:

means for sensing engine speed and producing an engine speed signal corresponding thereto; and means responsive to said engine speed signal for computing engine deceleration.

3. The system of claim 2 wherein said means responsive to said engine speed signal for computing engine deceleration includes means for differentiating said engine speed signal.

4. The system of claim 1 wherein said means for determining vehicle deceleration includes:
means for sensing vehicle speed and producing a vehicle speed signal corresponding thereto; and
means responsive to said vehicle speed signal for computing vehicle deceleration.

5. The system of claim 4 wherein said means responsive to said vehicle speed signal for computing vehicle deceleration includes means for differentiating said vehicle speed signal.

6. The system of claim 1 wherein said means for determining a downshift engine RPM of an automatically selectable gear of a transmission includes means for mapping said one of engine and vehicle deceleration and said one of commanded throttle percentage and engine load to said downshift engine RPM.

7. The system of claim 6 wherein said means for mapping said one of engine and vehicle deceleration and said one of commanded throttle percentage and engine load to said downshift engine RPM includes:
a memory unit having stored therein a table of downshift engine RPM offsets as a function of one of engine and vehicle deceleration values and of one of commanded throttle percentage and engine load values; and
a control computer responsive to said one of engine and vehicle deceleration and to said one of commanded throttle percentage and engine load to determine said downshift engine RPM from said table of downshift engine RPM offsets.

8. The system of claim 6 wherein said means for mapping said one of engine and vehicle deceleration and said one of commanded throttle percentage and engine load to said downshift engine RPM includes means for increasing said downshift engine RPM above a default downshift engine RPM if said one of engine and vehicle deceleration rate exceeds a first deceleration rate and said one of commanded throttle percentage and engine load exceeds a predefined commanded throttle percentage or engine load.

9. The system of claim 8 wherein said means for mapping said one of engine and vehicle deceleration and said one of commanded throttle percentage and engine load to said downshift engine RPM includes means for decreasing said downshift engine RPM below said default downshift engine RPM if said one of engine and vehicle deceleration rate falls below a second deceleration rate lower than said first deceleration rate and said one of commanded throttle percentage and engine load exceeds said predefined commanded throttle percentage or engine load.

10. A system for controlling downshifting of an automatically selectable gear of a transmission coupled to an internal combustion engine of a vehicle, comprising:
an internal combustion engine carried by a vehicle;
means for determining one of engine RPM and vehicle speed and producing a speed signal corresponding thereto;
a fuel system responsive to a fueling signal to supply fuel to said engine;
means for producing a throttle signal;
a transmission coupled to said engine and having at least one automatically selectable gear; and
a control computer responsive to said throttle signal to produce said fueling signal, said control computer determining an engine load value based on said fueling signal and a current deceleration rate based on said speed signal, said control computer determining a downshift engine RPM of said at least one automatically selectable gear based on a comparison of said current deceleration rate with a predefined deceleration rate and on one of said throttle signal and said engine load value, said control computer controlling downshifting of said at least one automatically selectable gear based on said downshift engine RPM.

11. The system of claim 10 wherein said control computer is operable to differentiate said speed signal to thereby determine said current deceleration rate.

12. The system of claim 10 wherein said control computer is operable to increase said downshift engine RPM above a default downshift engine RPM if said current deceleration rate exceeds a first deceleration rate and said one of said throttle signal and said engine load value exceeds a predefined throttle or high engine load condition.

13. The system of claim 12 wherein said control computer is operable to decrease said downshift engine RPM below said default downshift engine RPM if said current deceleration rate falls below a second deceleration rate lower than said first deceleration rate and said one of said throttle signal and said engine load value exceeds said predefined throttle or high engine load condition.

14. The system of claim 10 further including a memory unit having stored therein a table of downshift engine RPM offset values as a function of predetermined deceleration values and as a function of one of predetermined throttle values and predetermined engine load values;
and wherein said control computer is responsive to said current deceleration rate and said one of said throttle signal and said engine load value to determine said downshift engine RPM from said table of downshift engine RPM offsets.

15. The system of claim 10 further including an auxiliary computer associated with said transmission and in communication with said control computer, said auxiliary computer determining said downshift engine RPM of said at least one automatically selectable gear based on said based deceleration rate and on said one of said throttle signal and said engine load value.

16. A method of controlling downshifting of an automatically selectable gear of a transmission coupled to an internal combustion engine of a vehicle, comprising the steps of:
determining one of an engine and vehicle deceleration rate;
determining one of a commanded throttle percentage and engine load;
determining a downshift engine RPM of an automatically selectable gear of a transmission coupled to an internal combustion engine of a vehicle based on a comparison of said one of engine and vehicle deceleration rate with at least one predefined deceleration rate and on said one of commanded throttle percentage and engine load; and
controlling downshifting of said automatically selectable gear of said transmission based on said downshift engine RPM.

17. The method of claim 16 wherein the step of determining a downshift engine RPM includes the step of increasing said downshift engine RPM above a default downshift engine RPM if said one of engine and vehicle deceleration rate exceeds a first deceleration rate and said one of said commanded throttle percentage and said engine load exceeds a predefined commanded throttle percentage or engine load.

18. The method of claim 17 wherein the step of determining a downshift engine RPM includes the step of decreasing said downshift engine RPM below said default downshift engine RPM if said one of engine and vehicle deceleration rate falls below a second deceleration rate lower than said first deceleration rate and said one of said commanded throttle percentage and said engine load exceeds said predefined commanded throttle percentage or engine load.

19. The method of claim 16 wherein the step of determining said one of an engine and vehicle deceleration rate includes the steps of:

determining one of engine and vehicle speed; and
differentiating said one of engine and vehicle speed.

* * * * *

UNITED STATES PATENT AND TRADEMARK OFFICE
CERTIFICATE OF CORRECTION

PATENT NO. : 6,003,396
DATED : December 21, 1999
INVENTOR(S) : Steven M. Bellinger, et al.

It is certified that error appears in the above-identified patent and that said Letters Patent is hereby corrected as shown below:

Col. 12, line 38
     replace "based" (second occurrence)
   with --current--

Signed and Sealed this

Fifth Day of December, 2000

Attest:

Q. TODD DICKINSON

Attesting Officer            Director of Patents and Trademarks